(12) United States Patent
Xu et al.

(10) Patent No.: US 11,715,366 B2
(45) Date of Patent: Aug. 1, 2023

(54) SYSTEMS AND METHODS FOR ALARM PROCESSING

(71) Applicant: ZHEJIANG DAHUA TECHNOLOGY CO., LTD., Zhejiang (CN)

(72) Inventors: Yangbo Xu, Hangzhou (CN); Liang Chen, Hangzhou (CN); Wenjun Yuan, Hangzhou (CN); He Zhou, Hangzhou (CN); Xiang Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/647,979

(22) Filed: Jan. 14, 2022

(65) Prior Publication Data
US 2022/0139203 A1  May 5, 2022

Related U.S. Application Data

(63) Continuation of application No. PCT/CN2019/128226, filed on Dec. 25, 2019.

(30) Foreign Application Priority Data

Aug. 6, 2019  (CN) .......................... 201910721111.4

(51) Int. Cl.
G08B 25/00 (2006.01)
G08B 21/18 (2006.01)
(52) U.S. Cl.
CPC ......... *G08B 25/008* (2013.01); *G08B 21/182* (2013.01)
(58) Field of Classification Search
CPC .... G08B 25/008; G08B 21/182; G08B 25/00; G06F 11/3058; G06F 11/3065;
(Continued)

(56) References Cited

U.S. PATENT DOCUMENTS 10,541,865 B1 *  1/2020  Brophy ............... H04L 41/0813
2006/0026017 A1  2/2006  Walker
(Continued)

FOREIGN PATENT DOCUMENTS

CN   102724324 A   10/2012
CN   102957894 A   3/2013
(Continued)

OTHER PUBLICATIONS

The Extended European Search Report in European Application No. 19940799.0 dated Jul. 20, 2022, 10 pages.
(Continued)

*Primary Examiner* — Ojiako K Nwugo
(74) *Attorney, Agent, or Firm* — Metis IP LLC

(57) ABSTRACT

System and method for alarm processing are provided. The system may include a plurality of security devices. The plurality of security devices may be divided into at least one group. One group of the at least one group may include a first security device and one or more second security devices. The first security device may receive, from the one or more second security devices, one or more first alarms generated by the one or more second security devices. The first security device may determine that an alarm condition is satisfied based at least on one of the one or more first alarms and one or more second alarms generated by the first security device. The first security device may send, based on the determination, at least one of the one or more first alarms and the one or more second alarms to a user terminal.

26 Claims, 6 Drawing Sheets

(58) Field of Classification Search
CPC ............. G06F 11/3006; G06F 11/3024; G06F 11/3037; G06F 11/327
See application file for complete search history.

(56) References Cited

U.S. PATENT DOCUMENTS

| | | | | |
|---|---|---|---|---|
| 2006/0250236 A1* | 11/2006 | Ackley | ............... | H04L 67/04 340/540 |
| 2007/0103298 A1* | 5/2007 | Kim | ............... | G08B 25/009 340/539.22 |
| 2012/0076027 A1* | 3/2012 | Akyildiz | ............. | H04L 41/5025 370/252 |
| 2017/0053520 A1* | 2/2017 | Cook | ............... | G08B 25/10 |
| 2019/0333494 A1* | 10/2019 | Park | ............... | H04R 3/005 |
| 2021/0195415 A1* | 6/2021 | Yang | ............... | H04W 12/63 |
| 2021/0297839 A1* | 9/2021 | Oba | ............... | H04W 4/90 |

FOREIGN PATENT DOCUMENTS

| | | |
|---|---|---|
| CN | 103051822 A | 4/2013 |
| CN | 103108159 A | 5/2013 |
| CN | 104468819 A | 3/2015 |
| CN | 106303428 A | 1/2017 |
| CN | 106453443 A | 2/2017 |
| CN | 106657891 A | 5/2017 |
| CN | 106878473 A | 6/2017 |
| CN | 108600698 A | 9/2018 |
| CN | 109977260 A | 7/2019 |
| WO | 0127763 A1 | 4/2001 |
| WO | 2021022770 A1 | 2/2021 |

OTHER PUBLICATIONS

International Search Report in PCT/CN2019/128226 dated Apr. 24, 2020, 4 pages.
Written Opinion in PCT/CN2019/128226 dated Apr. 24, 2020, 6 pages.
First Office Action in Chinese Application No. 201910721111.4 dated May 13, 2020, 15 pages.

* cited by examiner

SYSTEMS AND METHODS FOR ALARM PROCESSING

CROSS-REFERENCE TO RELATED APPLICATIONS

This application is a Continuation of International Application No. PCT/CN2019/128226, filed on Dec. 25, 2019, which claims priority of Chinese Patent Application No. 201910721111.4, filed on Aug. 6, 2019, the entire content of which is incorporated herein by reference.

TECHNICAL FIELD

The present disclosure generally relates to network communication technology, and in particular, to systems and methods for alarm processing in network communication.

BACKGROUND

In practical scenarios, a user may use security devices for monitoring important places. The security devices may detect alarm events and send alarms corresponding to the alarm events to a user terminal of the user, such that the user may be timely aware of potential security risks of the important places. For example, the user may install security devices, such as a security camera and/or a security door with a fingerprint lock, in the house of the user. The security camera may send alarms to the user terminal in response to detecting abnormal images. The security door may send alarms to the user terminal in response to detecting fingerprints of a stranger.

In some occasions, a cloud server may be used to gather alarms from the security devices and further send these alarms to the user terminal. In this regard, the cloud server may need to store the alarms over a period of time. As the cloud server is usually provided by a third vendor or manufacturer, the manner of storing the alarms in the cloud server may lack protection of user privacy.

Therefore, it is desirable to provide effective systems and methods for alarm processing, thereby improving user experience and safety of security devices.

SUMMARY

In an aspect of the present disclosure, a system for alarm processing is provided. The system may include a plurality of security devices. Each of the plurality of security devices may be configured to generate one or more alarms in response to one or more alarm events. The plurality of security devices may be divided into at least one group, one group of the at least one group may include a first security device and one or more second security devices. The first security device may be configured to receive, from the one or more second security devices, one or more first alarms generated by the one or more second security devices. The first security device may be configured to determine that an alarm condition is satisfied based at least on one of the one or more first alarms and one or more second alarms generated by the first security device. The first security device may also be configured to send, based on the determination, at least one of the one or more first alarms and the one or more second alarms to a user terminal.

In some embodiments, to determine that an alarm condition is satisfied based at least on one of the one or more first alarms and one or more second alarms generated by the first security device, the first security device may be configured to determine that the one or more first alarms or the one or more second alarms include a target alarm event.

In some embodiments, to send, based on the determination, at least one of the one or more first alarms and the one or more second alarms to a user terminal, the first security device may be configured to send the first alarm or the second alarm that may include the target alarm event to the user terminal.

In some embodiments, each of the one or more first alarms and the one or more second alarms may correspond to an evaluation value that indicates an emergency degree of the corresponding alarm event. To determine that an alarm condition is satisfied based at least on one or more first alarms and one or more second alarms generated by the first security device, the first security device may be configured to determine that a summation of the evaluation values of the one or more first alarms and the one or more second alarms is greater than a threshold value.

In some embodiments, to send, based on the determination, at least one of the one or more first alarms and the one or more second alarms to a user terminal, the first security device may be configured to send the one or more first alarms and the one or more second alarms to the user terminal.

In some embodiments, to send, based on the determination, at least one of the one or more first alarms and the one or more second alarms to a user terminal, the first security device may be configured to generate an alarm package by packaging the one or more first alarms and the one or more second alarms. The first security device may be configured to generate an encrypted alarm package by encrypting the alarm package. The first security device may also be configured to send the encrypted alarm package to the user terminal.

In some embodiments, the first security device and the one or more second security devices in the at least one group may be determined intermittently according to a process. The process may include determining a processing capacity of each of one or more candidate security devices in the at least one group. The process may also include determining, based on the processing capacity of each of the one or more candidate security devices, the first security device and the one or more second security devices.

In some embodiments, for each candidate security device, its processing capacity may be associated with an unoccupied CPU capacity and an unoccupied memory capacity of the candidate security device.

In some embodiments, the plurality of security devices may be divided into the at least one group intermittently according to a second process. The second process may include determining, among the plurality of security devices, one or more security devices that may be capably connected to a target security device. The second process may also include determining the target security device and the one or more security devices as a group of the at least one group.

In some embodiments, at least one of the one or more security devices may include a monitoring device, an intelligence access control device, or an alarm device.

In some embodiments, the one or more second alarms may be stored in a storage device of the first security device, and the first security device may be further configured to store the one or more first alarms generated by the one or more second security devices in the storage device of the first security device.

In some embodiments, to send, based on the determination, at least one of the one or more first alarms and the one or more second alarms to a user terminal, the first security device may be further configured to obtain the at least one of the one or more first alarms and the one or more second alarms from the storage device of the first security device.

In another aspect of the present disclosure, a method for alarm processing is provided. The method may be implemented by a first security device of a monitoring system. The monitoring system may include a plurality of security devices. Each of the plurality of security devices may be configured to generate one or more alarms in response to one or more alarm events. The plurality of security devices may be divided into at least one group. One group of at least one group may include the first security device and one or more second security devices. The method may include receiving, from the one or more second security devices, one or more first alarms generated by the one or more second security devices. The method may include determining that an alarm condition is satisfied based at least on one of the one or more first alarms and one or more second alarms generated by the first security device. The method may also include sending, based on the determination, at least one of the one or more first alarms and the one or more second alarms to a user terminal.

In some embodiments, to determine that an alarm condition is satisfied based at least on one of the one or more first alarms and one or more second alarms generated by the first security device, the method may include determining that the one or more first alarms or the one or more second alarms include a target alarm event.

In some embodiments, to send, based on the determination, at least one of the one or more first alarms and the one or more second alarms to a user terminal, the method may include sending the first alarm or the second alarm that may include the target alarm event to the user terminal.

In some embodiments, each of the one or more first alarms and the one or more second alarms may correspond to an evaluation value that indicates an emergency degree of the corresponding alarm event. To determine that an alarm condition is satisfied based at least on one or more first alarms and one or more second alarms generated by the first security device, the method may include determining that a summation of the evaluation values of the one or more first alarms and the one or more second alarms is greater than a threshold value.

In some embodiments, to send, based on the determination, at least one of the one or more first alarms and the one or more second alarms to a user terminal, the method may include sending the one or more first alarms and the one or more second alarms to the user terminal.

In some embodiments, to send, based on the determination, at least one of the one or more first alarms and the one or more second alarms to a user terminal, the method may include generating an alarm package by packaging the one or more first alarms and the one or more second alarms. The method may include generating an encrypted alarm package by encrypting the alarm package. The method may also include sending the encrypted alarm package to the user terminal.

In some embodiments, the first security device and the one or more second security devices in the at least one group may be determined intermittently according to a process. The process may include determining a processing capacity of each of one or more candidate security devices in the at least one group. The process may also include determining, based on the processing capacity of each of the one or more candidate security devices, the first security device and the one or more second security devices.

In some embodiments, for each candidate security device, its processing capacity may be associated with an unoccupied CPU capacity and an unoccupied memory capacity of the candidate security device.

In some embodiments, the plurality of security devices may be divided into the at least one group intermittently according to a second process. The second process may include determining, among the plurality of security devices, one or more security devices that may be capably connected to a target security device. The second process may also include determining the target security device and the one or more security devices as a group of the at least one group.

In some embodiments, at least one of the one or more security devices may include a monitoring device, an intelligence access control device, or an alarm device.

In some embodiments, the one or more second alarms may be stored in a storage device of the first security device. The method may further include storing the one or more first alarms generated by the one or more second security devices in the storage device of the first security device.

In some embodiments, to send, based on the determination, at least one of the one or more first alarms and the one or more second alarms to a user terminal, the method may further include obtaining the at least one of the one or more first alarms and the one or more second alarms from the storage device of the first security device.

In another aspect of the present disclosure, a system for alarm processing is provided. The system may include a plurality of security devices. Each of the plurality of security devices may be configured to generate one or more alarms in response to one or more alarm events. The plurality of security devices may be divided into at least one group. One group of the at least one group may include a first security device and one or more second security devices. The first security device may include an acquisition module configured to receive, from the one or more second security devices, one or more first alarms generated by the one or more second security devices. The first security device may include a determination module configured to determine that an alarm condition is satisfied based at least on one of the one or more first alarms and one or more second alarms generated by the first security device. The first security device may also include a transmission module configured to send, based on the determination, at least one of the one or more first alarms and the one or more second alarms to a user terminal.

In another aspect of the present disclosure, a non-transitory computer readable medium including at least one set of instructions for alarm processing in a monitoring system is provided. The monitoring system may include a plurality of security devices. Each of the plurality of security devices may be configured to generate one or more alarms in response to one or more alarm events. The plurality of security devices may be divided into at least one group. One group of the at least one group may include a first security device and one or more second security devices. When executed by one or more processors of the first security device, the at least one set of instructions may cause the first security device to perform a method. The method may include receiving, from the one or more second security devices, one or more first alarms generated by the one or more second security devices. The method may include determining that an alarm condition is satisfied based at least on one of the one or more first alarms and one or more second alarms generated by the first security device. The method may also include sending, based on the determination, at least one of the one or more first alarms and the one or more second alarms to a user terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression(s) if they may achieve the same purpose.

Figure 4:
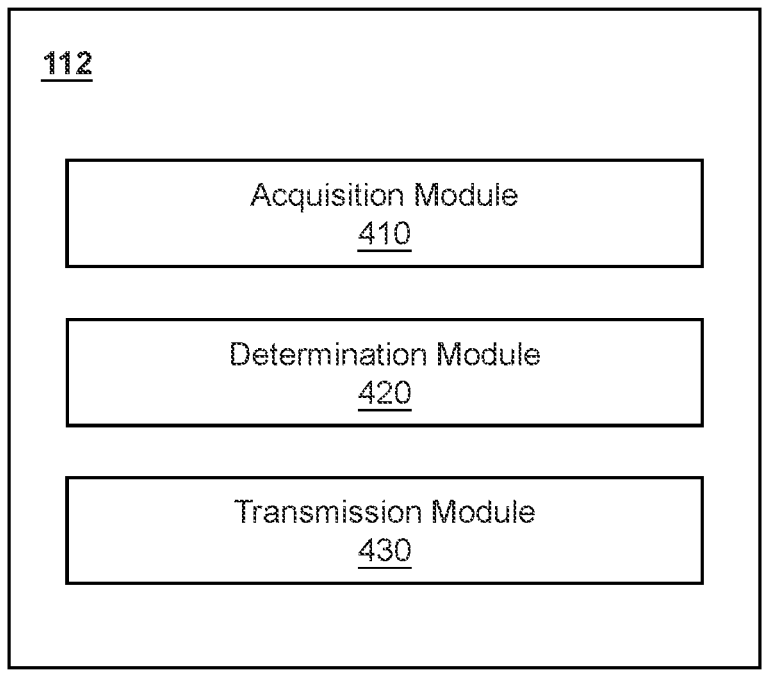
FIG. 4 is a schematic diagram illustrating an exemplary processing component of a security device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., an alarm processing device as illustrated in FIG. 4) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a system and method for alarm processing. The system may include a plurality of security devices. Each of the plurality of security devices may be configured to generate one or more alarms in response to one or more alarm events. The plurality of security devices may be divided into at least one group. A group of the at least one group may include a first security device and one or more second security devices. The first security device may receive one or more first alarms generated by the one or more second security devices from the one or more second security devices. The first security device may also determine that an alarm condition is satisfied based at least on one of the one or more first alarms and one or more second alarms generated by the first security device. The first security device may further send at least one of the one or more first alarms and the one or more second alarms to a user terminal based on the determination.

According to some embodiments of the present disclosure, the first security device may serve as an intermediary device for alarm processing and transmission between a group of security devices (including the first security device and the second security device(s)) and the user terminal associated with a user. For example, the user terminal may receive and display one or more alarms generated by the group of security devices via the first security device. In this way, the alarm(s) may not need to be transmitted through a cloud server and/or be stored in the cloud server, which may avoid the leak of the user privacy, improve the user experience, and reduce the complexity and cost of the system for alarm processing. In addition, in some embodiments, the first security device may package and encrypt the alarm(s) generated by the first security device and/or the second security device(s) before sending the alarm(s) to the user terminal. In this way, the user terminal may not need to receive the alarm(s) via each security device of the group of security devices, which may improve user experience and safety during the transmission of the alarm(s).

Figure 1A:
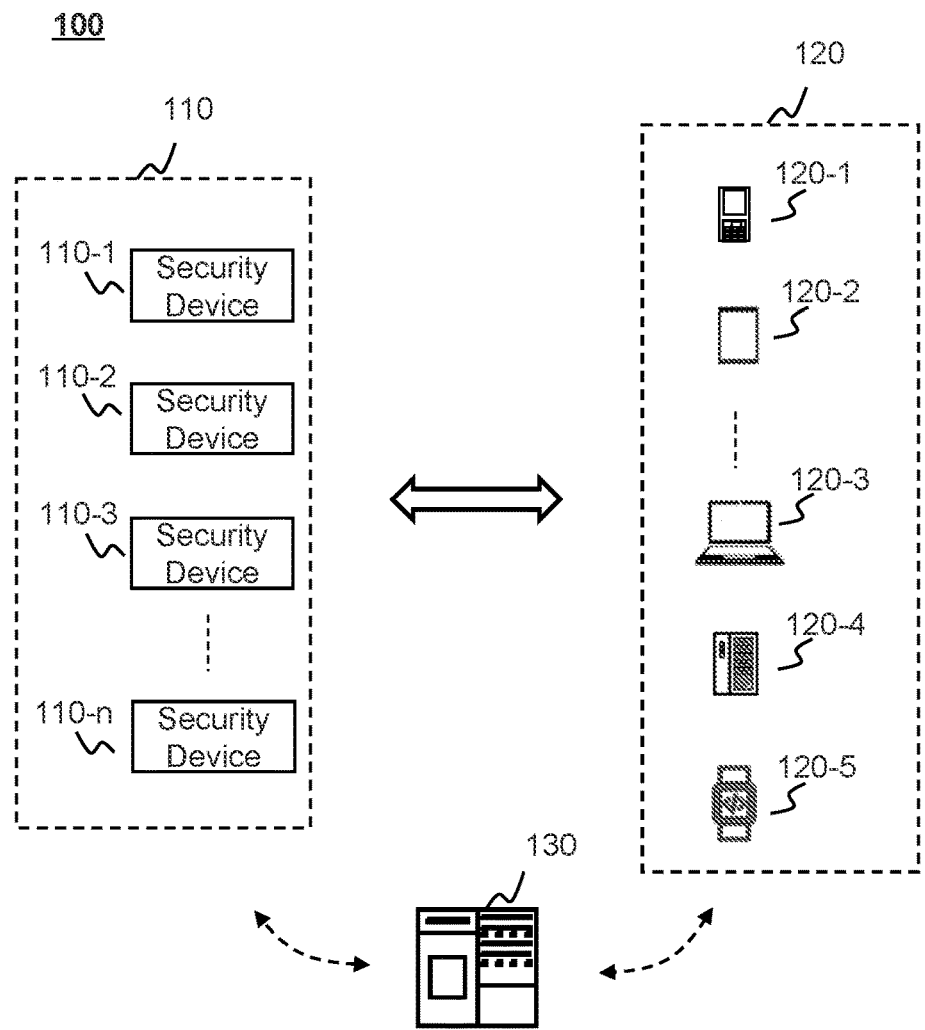
FIG. 1A illustrates a schematic diagram of an exemplary security system for alarm processing according to some embodiments of the present disclosure.

FIG. 1A illustrates a schematic diagram of an exemplary security system 100 for alarm processing according to some embodiments of the present disclosure. The security system 100 may allow a terminal device associated with a user to receive alarms efficiently (e.g., in a low frequency) and safely. The security system may be used as, for example, a communication system, a surveillance system, or the like, and be applied in various scenarios, such as a residential building, an office building, a shopping mall, a hospital, etc. For illustration purposes, the present disclosure is described with reference to a security system 100 applied in a residential building. This is not intended to limit the scope of the present disclosure, and the security system 100 may be applied in any other scenarios (e.g., an office building, a collection of buildings in a residential community or a business center).

As shown in FIG. 1, the security system 100 may include a plurality of security devices 110, one or more terminal devices 120, etc. The plurality of security devices 110 and the terminal device(s) 120 may be operably connected to each other. For example, the plurality of security devices 110 may be positioned outside a house gate and/or inside a house of a user (e.g., a particular resident) in the residential building. A terminal device 120 may be associated with the user, e.g., the terminal device 120 may be carried or used by the particular resident. When the particular resident is distant away from the house, he/she may use the terminal device 120 to monitor the house.

The plurality of security devices 110 may include a security device 110-1, a security device 110-2, a security 110-3, . . . , and a security 110-n. In some embodiments, the plurality of security devices 110 may include security devices belonging to a same type or different types. Exemplary security devices may include a monitoring device, an intelligence access control device, an alarm device, or the like, or any combination thereof. Exemplary monitoring device may include an image acquisition device (e.g., an IP camera), an infrared device, etc. Exemplary intelligence access control device may include a card access control device, a coded access control device (e.g., a coded lock), a fingerprint access control device (e.g., a fingerprint lock), a face recognition access control device (e.g., a face recognition lock), etc. Exemplary alarm device may include a fire alarm device, a gas alarm device, a window or door magnetic alarm device, etc. In some embodiments, the plurality of security devices 110 may be divided into one or more groups. Each group of the one or more groups may include one or more security devices 110 that are capably connected to each other. The one or more security devices 110 that are capably connected to each other refer to the one or more security devices 110 that may communicate/share information with each other. For example, the one or more security devices 110 of a group may be connected to a same network. For a group, the one or more security devices in the group may belong to a same type or different types. For example, the one or more security devices 110 in a group may be of a same type of IP cameras (e.g., IP cameras provided by a same vendor or manufacture) and the IP cameras may communicate (e.g., exchange information/data) with each other. As another example, the one or more security devices 110 in a group may be of different types of IP cameras (e.g., IP cameras provided by different vendors or manufactures) and the IP cameras may communicate with each other through a cross-platform communication protocol (e.g., a Universal Plug-n-Play (UPnP) protocol). As still another example, the one or more security devices 110 in a group may include different types of security devices such as IP cameras and coded locks. The different types of security devices may communicate with each other through a cross-platform communication protocol (e.g., a Universal Plug-n-Play (UPnP) protocol). More descriptions regarding dividing the plurality of security devices 110 into one or more groups may be found elsewhere in the present disclosure (e.g., FIG. 6 and the descriptions thereof).

Each of the plurality of security devices 110 may be configured to generate one or more alarms in response to one or more alarm events. As used herein, an alarm refers to a warning notice associated with an alarm event. An alarm may include an identification of the alarm event (e.g., a serial number such as "p", "w", "q"), a time of the alarm event (e.g., a time point when the alarm event occurs), a content of the alarm event (e.g., data/information of the alarm event detected by a security device that generates the alarm), a type of the alarm event, an identification of a security device that generates the alarm, or the like, or any combination thereof. The type of the alarm event may include a description of the alarm event and vary depending on the type of the security device. Merely by way of example, for the security device being an IP camera, the type of the alarm event may include a moving of an object, an object crossing a monitoring line, etc., at a particular time period (e.g., a time period when the user of the terminal device 120 leaves the house). As another example, for the security device being a fingerprint lock, the type of the alarm event may include the number (count) of consecutive failed attempts of opening the fingerprint lock being greater than a preset threshold number, etc. As still another example, for the security device being a window magnetic alarm device, the type of the alarm event may include the window being opened at a particular time period (e.g., from 0:00 am to 2:00 am). The identification of a security device may be used to distinguish the security device from other security devices of the plurality of security devices 110. For example, the identification of a security device may include a serial/channel number (e.g., 001, 010, or 011), a MAC address, a name, or the like, or any combination thereof, of the security device. The type of an alarm event and/or the identification of a security device may be a default setting of the security system or be set by a user of the security system (e.g., the plurality of security devices 110).

In some embodiments, the plurality of security devices 110 and the terminal device(s) 120 may be capably connected with each other. For example, the plurality of security devices 110 may store an identification (e.g., a communication address, a name, etc.) of a terminal device 120 and the terminal device 120 may store identification(s) (e.g., a, b, c) of the plurality of security devices 110. In some embodiments, the plurality of security devices 110 may be connected to a network to communicate with one or more components of the security system (e.g., a portion of the plurality of security devices 110, the terminal device(s) 120). For example, a particular security device of the plurality of security devices 110 may send one or more alarms generated by the particular security device to the terminal device(s) 120 and/or one or more security devices that are in the same group as the particular security device via the network. As another example, the particular security device may receive one or more alarms generated by the one or more security devices that are in the same group as the particular security device via the network. As still another example, the security device(s) 110 may send one or more alarms generated by the security device(s) 110 to a server 130 (e.g., an information push server (e.g., a server of a network operator of the server terminal 130) via the network. The server 130 may send the one or more alarms received from the security device(s) to the terminal device(s) 120 via the network. In some embodiments, the server may be a single server or a server group. The server group may be centralized or distributed (e.g., the server may be a distributed system). In some embodiments, the server may be local or remote. In some embodiments, the server may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof.

In some embodiments, the network may be any type of wired or wireless network, or combination thereof. Merely by way of example, the network may include a cable network, a wireline network, an optical fiber network, a tele-communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network may include one or more network access points. For example, the network may include wired or wireless network access points, through which one or more components of the security system may be connected to the network to exchange data and/or information.

The terminal device(s) 120 may be any electronic device used by a user (e.g., the particular resident of the residential building) associated with the security device(s) 110. In some embodiments, the terminal device(s) 120 may include a mobile device 120-1, a tablet computer 120-2, a laptop computer 120-3, a built-in device in a vehicle 120-4, a wearable device 120-5, or the like, or any combination thereof. In some embodiments, the mobile device 120-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the built-in device in the vehicle 120-4 may include an onboard computer, an onboard television, etc. In some embodiments, the wearable device 120-5 may include a smart bracelet, a smart footgear, smart glasses, a smart helmet, a smart watch, smart clothing, a smart backpack, a smart accessory, or the like, or any combination thereof. In some embodiments, the terminal device 120 may be implemented on a computing device 200 having one or more components illustrated in FIG. 2, or a mobile device 300 having one or more components illustrated in FIG. 3 in the present disclosure.

In some embodiments, the terminal device(s) 120 may be configured to facilitate communications between a user (e.g., a particular resident associated with the security device(s) 110) and the security system. For example, the user may set a type of alarm event for which the security device(s) 110 may generate an alarm through the terminal device(s) 120. As another example, the user may access the security device(s) 110 to, for example, set a target alarm event and/or a threshold value associated with when the security device(s) 110 may send one or more alarms via the terminal device(s) 120.

Figure 1B:
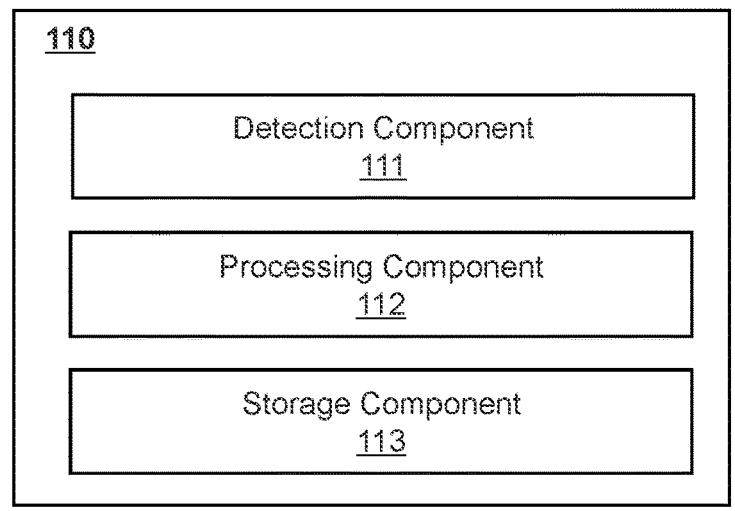
FIG. 1B is a schematic diagram of an exemplary security device according to some embodiments of the present disclosure.

FIG. 1B is a schematic diagram of an exemplary security device 110 according to some embodiments of the present disclosure. The security device 110 may include a detection component 111, a processing component 112, a storage component 113, etc.

The detection component 111 may be configured to detect one or more alarm events and generate one or more alarms in response to the one or more alarm events. For example, for the security device 110 being an IP camera, the detection component 111 may acquire image data in a field of view of the IP camera. The detection component 111 may identify an alarm event by analyzing the image data. The detection component 111 may generate an alarm corresponding to the alarm event and store the alarm in the storage component 113. As another example, for the security device 110 being a coded lock, the detection component 111 may determine whether an alarm event occurs based on the number (count) of consecutive failed attempts of opening the coded lock. In response to a determination that the alarm event occurs, the detection component 111 may generate an alarm corresponding to the alarm event.

The processing component 112 may process information and/or data relating to the security device 110 to perform one or more functions of the security device 110 described in the present disclosure. For example, the processing component 112 may identify one or more security devices that are capably connected to the security device 110. When connected, the one or more security devices and the security device 110 may be designated as in a group. In some embodiments, the security devices in a same group may include a first security device (also referred to as a central security device) and one or more second security devices (also referred to as edge security devices). The first security device may gather the alarm(s) that are generated by itself and one or more other security devices (e.g., the second security device(s)) in the group during a specific period, and further process the gathered alarm(s) according to a specific rule. The second security device may simply gather the alarm(s) generated by itself other than any other security device in the group, and may optionally process its generated alarm(s). For example, when the security device 110 is a first security device, the processing component 112 may receive one or more alarms generated by the one or more second security devices. The processing component 112 may determine whether an alarm condition is satisfied based at least on one of the one or more alarms generated by the security device 110 and the one or more alarms generated by the one or more second security devices. The processing component 112 may send at least one of the one or more alarms generated by the security device 110 and the one or more alarms generated by the one or more second security devices to the terminal device(s) 120 based on the determination. When the security device 110 is a second security device, the processing component 112 may send the one or more alarms generated by the security device 110 to the first security device in the group. More descriptions regarding the determination of a first security device and one or more second security devices in a group may be found elsewhere in the present disclosure (e.g., FIG. 6 and the descriptions thereof). In some embodiments, the processing component 112 may include one or more processing devices (e.g., single-core processing device(s) or multi-core processor(s)). Merely by way of example, the processing component 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

Merely for illustration, only one processing component may be described in the security device 110. However, it should be noted that the security device 110 of the present disclosure may also include multiple processing components, and thus operations and/or method steps that are performed by one processing component as described in the present disclosure may also be jointly or separately performed by the multiple processing components. For example, if in the present disclosure the processing component of the security device 110 executes both operations A and operation B, it should be understood that operation A and operation B may also be performed by two or more different processing components jointly or separately in the security device 110 (e.g., a first processing component executes operation A and a second processing component executes operation B, or vice versa, or the first and second processing components jointly execute operations A and B).

The storage component 113 may store data and/or instructions. For example, when the security device 110 is a first security device, the storage component 113 may store one or more alarms generated by the security device 110 and/or one or more second security devices in the same group as the security device 110. As another example, when the security device 110 is a second security device, the storage component 113 may only store one or more alarms generated by the security device 110 itself. As still another example, the storage component 113 may store data and/or instructions that the processing component 112 may execute or use to perform exemplary methods described in the present disclosure. In some embodiments, the storage component 113 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage component 113 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage component 113 may include at least one network port to communicate with other components in the security device 110. For example, the storage component 113 may be connected to a network (similar to the network aforementioned in the present disclosure) to communicate with one or more components of the security device 110 (e.g., the detection component 111, the processing component 112) via the at least one network port. One or more components in the security device 110 may access the data or instructions stored in the storage component 113 via the network. In some embodiments, the storage component 113 may be directly connected to or communicate with one or more components in the security device 110 (e.g., the detection component 111, the processing component 112).

It should be noted that the above description regarding the security system is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the security device 110 may include one or more additional components and/or one or more components of the security device may be omitted. For example, the security device 110 may include a communication component to facilitate data communications between the security device 110 and the terminal device(s) 120. In some embodiments, one or more components of the security device 110 may be integrated into one component, or one component of the security device 110 may be divided into multiple components. For example, the processing component 112 and the storage component 113 may be integrated into one component.

Figure 2:
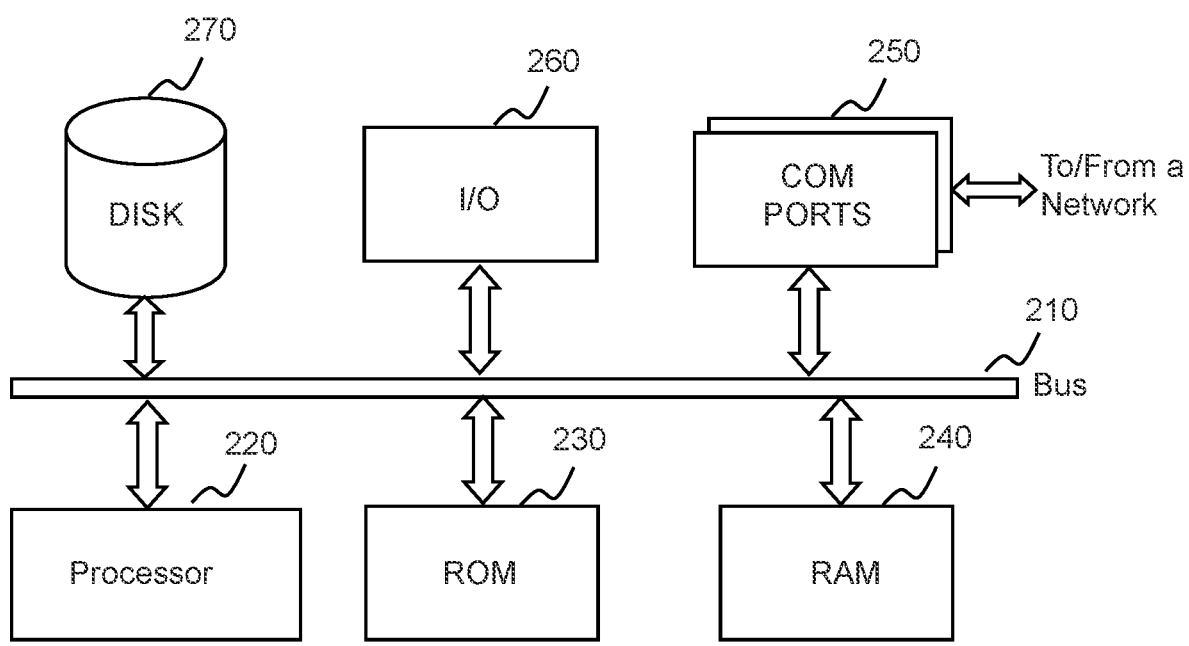
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. The computing device 200 may be used to implement any component of the security system as described herein. For example, the processing component 112 and/or the terminal(s) 130 may be implemented on the computing device 200, respectively, via its hardware, software program, firmware, or a combination thereof. Although only one such computing device is shown, for convenience, the computer functions relating to the processing component 112 of the security system as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the terminal(s) 120) in the security system. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. Exemplary RAM may include a dynamic RAM (DRAM), a synchronous dynamic RAN (SDRAN), an enhanced synchronous dynamic RAM (ESDRAM), a synchlink dynamic RAM (SLDRAM), a Rambus dynamic RAM (RDRAM), a Rambus direct RAM (RDRAM'), a direct Rambus dynamic RAM (DRDRAM), a double date rate synchronous dynamic RAM (DDR SDRAM), a static RAM (SRAM), a thyristor RAM (T-RAM), and a zero-capacitor RAM (Z-RAM), etc. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
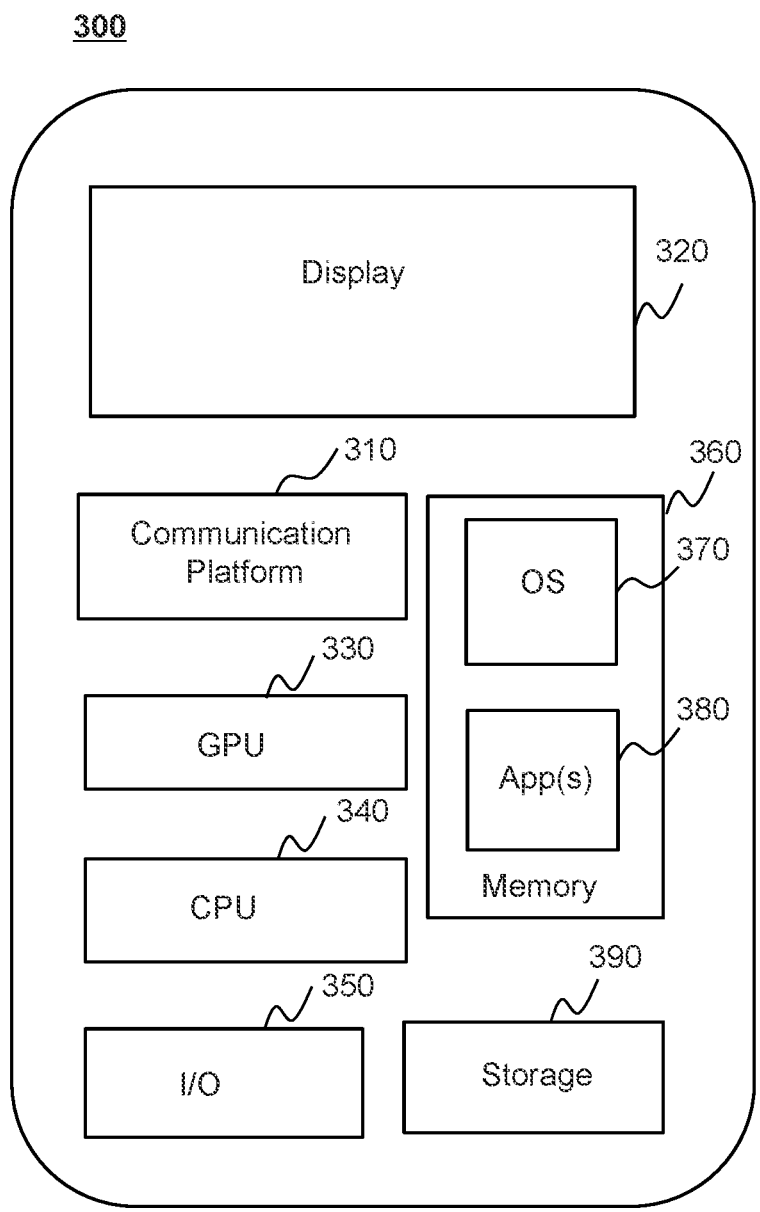
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more components (e.g., the processing component 112, the terminal 120) of the security system may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing component 112. User interactions with the information stream may be achieved via the I/O 350 and provided to the processing component 112 and/or other components of the security system via a network (e.g., a network as aforementioned elsewhere in the present disclosure).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

FIG. 4 is a schematic diagram illustrating an exemplary processing component 112 of a security device 110 according to some embodiments of the present disclosure. As shown in FIG. 4, the processing component 112 may include an acquisition module 410, a determination module 420, and a transmission module 430.

The acquisition module 410 may be configured to obtain information/data from one or more components of the security system 100. For example, the acquisition module 410 may obtain processing capacities of one or more security devices from the one or more security devices that are in a same group as the security device 110. In some embodiments, for the security device 110 being a first security device, the acquisition module 410 may receive one or more first alarms from one or more second security devices that are in a same group as the first security device.

The determination module 420 may be configured to determine a processing capacity of the security device 110 and/or processing capacities of the one or more security devices that are in a same group as the security device 110. The determination module 420 may also be configured to determine whether the security device 110 is a first security device. In some embodiments, for the security device 110 being a first security device, the determination module 420 may be configured to determine whether an alarm condition is satisfied based at least on one of the one or more first alarms generated by the one or more second security devices and the one or more second alarms generated by the first security device. For example, the determination module 420 may determine whether the one or more first alarms and/or the one or more second alarms include a target alarm event. As another example, the determination module 420 may determine whether the number (count) of the one or more first alarms and the one or more second alarms is greater than a threshold count. As still another example, the determination module 420 may whether a summation of all or a portion of the evaluation values of the one or more first alarms and the one or more second alarms is greater than a threshold value. More descriptions regarding the determination of whether the alarm condition is satisfied may be found elsewhere in the present disclosure (e.g., FIG. 6 and the descriptions thereof).

The transmission module 430 may be configured to exchange information/data with one or more components of the security system 100. For example, the transmission module 430 may send a processing capacity of the security device 110 to the one or more security devices that are in a same group as the security device 110. In some embodiments, for the security device 110 being a first security device, the transmission module 430 may send the at least one of the one or more first alarms and the one or more second alarms to a user terminal. Alternatively, the transmission module 430 may encrypt the at least one of the one or more first alarms and the one or more second alarms before sending them to the user terminal. More descriptions regarding the sending the first alarm(s) and/or the second alarm(s) may be found elsewhere in the present disclosure (e.g., FIG. 6 and the descriptions thereof). In some embodiments, for the security device 110 being a second security device, the transmission module 430 may send the first alarm(s) generated by the second security device to the first security device.

It should be noted that the above descriptions of the processing component 112 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the acquisition module 410 and the determination module 420 may be integrated into a single module. As another example, the determination module 420 may include a first unit to determine that the security device 110 is a first security device, and a second unit to determine whether an alarm condition is satisfied. In some embodiments, one or more of the modules mentioned above may be omitted and/or one or more additional modules may be added in the processing component 112. For example, the processing component 112 may further include a storage module.

Figure 5:
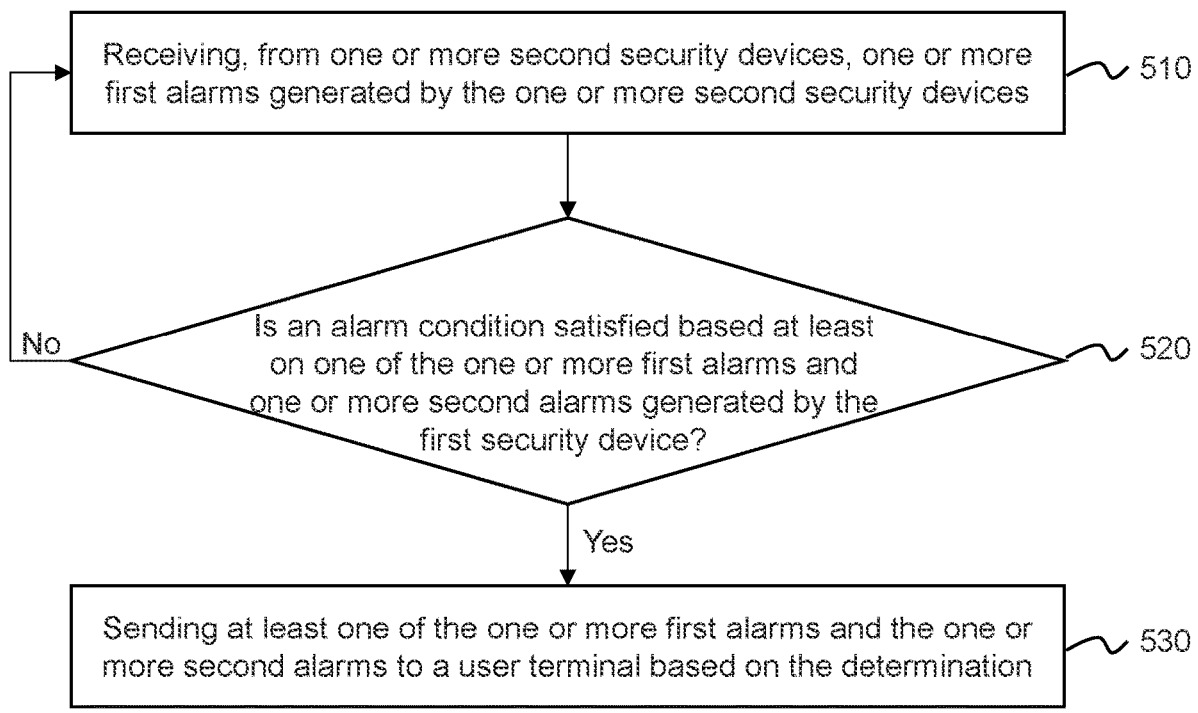
FIG. 5 is a flowchart of an exemplary process for alarm processing in a security system according to some embodiments of the present disclosure.

FIG. 5 is a flowchart of an exemplary process 500 for alarm processing in a security system according to some embodiments of the present disclosure. In some embodiments, one or more operations in the process 500 may be implemented in a security device 110 of the security system 100 illustrated in FIGS. 1A and 1B. For example, one or more operations in the process 500 may be stored in a storage device (e.g., a storage component 113 of a security device 110, the ROM 230, the RAM 240, and/or the storage 390) as a form of instructions, and invoked and/or executed by a processing component 112 (e.g., the processor 220, the CPU 340, and/or one or more modules illustrated FIG. 4) of the security device 110. In some embodiments, the operations of process 500 may be performed by the security device 110 when the security device 110 is a first security device in a group of the security system (e.g., the security system 100).

In 510, the first security device (e.g., a processing component 112 of the first security device, an acquisition module 410 of the processing component 112) may receive, from one or more second security devices, one or more first alarms generated by the one or more second security devices.

In some embodiments, the one or more second security devices may be capably connected to the first security device and be in the same group as the first security device. The one or more second security devices and the first security device may be of a same type or different types. In some embodiments, the first security device and the one or more second security devices in the same group may be determined based on a processing capacity of each of the first security device and the one or more second security devices. For example, a processing capacity of the first security device may be greater than a processing capacity of each of the one or more second security devices. The determination of the first security device and the second security devices may be described in connection with FIG. 6.

In some embodiments, the one or more second security devices may generate the one or more first alarms in response to one or more first alarm events. The first alarm event(s) may be the same as or similar to the alarm events as described in FIG. 1A, and be not repeated herein. The one or more second security devices may send the one or more first alarms to the first security device. For example, the first security device may have an identification of "a" and also be referred to as a security device "a", and the second security device(s) may have identifications of "b" and "c" and also be referred to as a security device "b" and a security device "c". The security device "b" and the security device "c" may generate alarm(s) in response to alarm event(s) and send the alarm(s) to the security device "a".

In some embodiments, the first security device may store the first alarms in a storage device (e.g., a storage component 113 of the first security device) in response to receiving the first alarms. In some embodiments, the first security device may generate one or more second alarms in response to one or more second alarm events that are detected by the first security device itself, and also store the one or more second alarms in a storage device (e.g., the storage component 113 of the first security device that stores the first alarms). The second alarm event(s) may be the same as or similar to the alarm events as described in FIG. 1A, and be not repeated here. The type(s) of the first alarm event(s) may be the same as or different from the type(s) of the second alarm event(s). For example, if the second security device(s) and the first security device are all IP cameras, the first alarm event(s) and the second alarm event(s) may be of the same type. In some embodiments, the first security device may receive the first alarm(s) generated by the second security device(s) in real time (e.g., as soon as each second security device generates a first alarm), or the second security device(s) may send the first alarm(s) to the first security device intermittently (e.g., per 5 minutes, per 30 seconds, or when a count of the first alarms in the second security device(s) is greater than a predetermined count, etc.).

In 520, the first security device (e.g., the processing component 112, a determination module 420 of the processing component 112) may determine whether an alarm condition is satisfied based at least on one of the one or more first alarms generated by the one or more second security devices and the one or more second alarms generated by the first security device. In response to a determination that an alarm condition is satisfied, process 500 may proceed to operation 530. In response to a determination that an alarm condition is not satisfied, process 500 may proceed to operation 510.

In some embodiments, the first security device may determine whether the one or more first alarms and/or the one or more second alarms include a target alarm event. In response to a determination that the one or more first alarms and/or the one or more second alarms include a target event, process 500 may proceed to 530. In response to a determination that the one or more first alarms and/or the one or more second alarms include no target event, process 500 may repeat 510. As used herein, the target alarm event may include any type of alarm event that is set by a user (e.g., a user of the security system 100) or is a default setting of the security system 100, for example, an alarm event with a relatively high emergency degree. For example, the first security device may store an identification of the target event. When the first security device determines that the one or more first alarms and/or the one or more second alarms include an identification of an alarm event that is the same as the identification of the target event, the first security device may determine that the corresponding first alarm(s) or second alarm(s) includes the target event.

In some embodiments, the first security device may determine whether the number (count) of the one or more first alarms and the one or more second alarms is greater than a threshold count. In response to a determination that the one or more first alarms and the one or more second alarms is greater than the threshold count, process 500 may proceed to 530. In response to a determination that the one or more first alarms and the one or more second alarms is less than the threshold count, process 500 may repeat 510. The threshold count may be set by a user of the security system 100 or be a default setting of the security system, and be stored in the first security device. It should be noted that, in response to a determination that the one or more first alarms and the one or more second alarms is equal to the threshold count, process 500 may proceed to operation 510 or operation 530.

In some embodiments, each of the one or more first alarms and the one or more second alarms may correspond to an evaluation value that indicates an emergency degree of the corresponding alarm event. For a particular alarm event or an alarm, the corresponding evaluation value may vary according to different situations. For example, the corresponding evaluation value may be different in different days (e.g., weekdays and weekend). As another example, the corresponding evaluation value may be different at different time periods of a day (e.g., day time and night time). As still another example, the corresponding evaluation value may be updated intermittently or periodically based on a preset rule (which is determined by the user of the security system 100 or a default updating setting of the security system 100. In some embodiments, the first security device may determine whether a summation of all or a portion of the evaluation values of the one or more first alarms and the one or more second alarms is greater than a threshold value. In response to a determination that a summation of the evaluation values of the one or more first alarms and the one or more second alarms is greater than the threshold value, process 500 may proceed to 530. In response to a determination that a summation of the evaluation values of the one or more first alarms and the one or more second alarms is less than the threshold value, process 500 may repeat 510. The threshold value may be set by a user of the security system 100 or be a default setting of the security system, and be stored in the first security device. It should be noted that, in response to a determination that a summation of the evaluation values of the one or more first alarms and the one or more second alarms is equal to the threshold value, process 500 may proceed to operation 510 or operation 530.

In some embodiments, the first security device may determine the summation of the evaluation values of the one or more first alarms and the one or more second alarms in consideration of different weights of the one or more first alarms and the one or more second alarms. Merely by way of example, the one or more first alarms and the one or more second alarms may have different weights according to locations where the first security device and the one or more second security devices are mounted. If a particular security device is mounted at a relatively important location (e.g., at a house gate of a residential building), the first security device may determine that an alarm generated by the particular security device has a relatively high weight according to a relationship between locations and weights. As another example, the weights of the one or more first alarms and the one or more second alarms may be different according to corresponding alarm events of the one or more first alarms and the one or more second alarms. The weights of the one or more first alarms and the one or more second alarms may be determined by the user of the security system 100, and the user may adjust the weights of the one or more first alarms and the one or more second alarms according to actual requirements.

In some embodiments, the first security device may directly determine the summarization of the evaluation value(s) of the first alarm(s) and the second alarm(s). In some embodiments, the first security device may store a corresponding relationship of a plurality of evaluation values and a plurality of alarm events. The first security device may acquire an evaluation value corresponding to each of the first alarm(s) and the second alarm(s) based on the corresponding relationship and determine the summarization of the evaluation value (s) of the first alarm(s) and the second alarm(s). An exemplary relationship between an evaluation and an alarm event may be illustrated in Table 1:

TABLE 1

| Identification of Alarm Event | Evaluation Value | Description |
|---|---|---|
| p | 10 | An object crossing a monitoring line 1 |
| w | 50 | An object crossing a monitoring line 2 |
| q | 80 | Moving of an object |

As shown in Table 1, an alarm event "p" associated with an object crossing a monitoring line 1 may correspond to an evaluation value of 10, an alarm event "w" associated with an object crossing a monitoring line 2 may correspond to an evaluation value of 50, and an alarm event "q" associated with a moving of an object may correspond to an evaluation value of 80.

In 530, the first security device (e.g., the processing component 112, a transmission module of the processing component 112) may send at least one of the one or more first alarms and the one or more second alarms to a user terminal based on the determination. In some embodiments, the first security device may store an identification of the user terminal and send the at least one of the one or more first alarms and the one or more second alarms based on the identification of the user terminal.

In some embodiments, in response to the determination that the one or more first alarms and/or the one or more second alarms include a target event, the first security device may send the first alarm or the second alarm that includes the target alarm event to the user terminal. For example, the first security device may only send the first alarm or the second alarm that includes the target alarm event to the user terminal, and other alarms of the one or more first alarms and the one or more second alarms may be still stored in the first security device for determining a summation of the evaluation values of the other alarms and new alarms that are received or generated by the first security device. As another example, the first security device may send the one or more first alarms and the one or more second alarms to the user terminal. In some embodiments, the first security device may retrieve the first alarm or the second alarm that includes the target alarm event or the one or more first alarms and/or the one or more second alarms from a storage device (e.g., the storage component 113 of the first security device).

In some embodiments, in response to the determination that a summation of the evaluation values of the one or more first alarms and the one or more second alarms is greater than a threshold value, the first security device may send the one or more first alarms and the one or more second alarms to the user terminal. In some embodiments, the first security device may retrieve the one or more first alarms and the one or more second alarms from a storage device (e.g., the storage component 113 of the first security device), and generate an alarm package by packaging the one or more first alarms and/or the one or more second alarms. Optionally, the first security device may generate an encrypted alarm package by encrypting the alarm package using an encryption technique. The first security device may send the encrypted alarm package to the user terminal, which improves a safety during the transmission of the alarms. Exemplary encryption technique may include an asymmetric encryption technique, a symmetric encryption technique, a digital certificate technique, or the like, or any combination thereof. Taking the asymmetric encryption technique as an example, the first security device and the user terminal may each own a private key and a public key. A private key of the user terminal may be held privatively by the user terminal, and a public key of the user terminal may be freely shared with the first security device and/or other security devices of the security system. In some cases, the first security device may encrypt the alarm package using the public key of the user terminal before sending encrypted alarm package to the user terminal. The user terminal may need to decrypt the encrypted alarm package using the private key of the user terminal. In some embodiments, the first security device may retrieve the one or more first alarms and the one or more second alarms from a storage device (e.g., the storage component 113 of the first security device), and encrypt the one or more first alarms and/or the one or more second alarms. The first security device may generate an alarm package by packaging the one or more encrypted first alarms and/or the one or more encrypted second alarms. It should be noted that the abovementioned encryption technique is provided as an example, and not intended to limit the scope of the present disclosure. Exemplary alarms stored in the storage component 113 of the first security device may be illustrated in Table 2.

TABLE 2

| Alarm | Time of Alarm Event | Identification of Security Device | Type of Alarm Event | Data of Alarm Event |
|---|---|---|---|---|
| 1 | 2019-01-01-10:01 | b | An object crossing a monitoring line | Image 1 |
| 2 | 2019-01-01-10:02 | b | An object crossing a monitoring line | Image 2 |
| 3 | 2019-01-01-10:03 | c | Moving of an object | Image 3 |

As shown in Table 2, each of alarm 1, alarm 2 and alarm 3 may include a time of alarm event corresponding to the alarm, an identification of security device that generates the alarm, a type of alarm event corresponding to the alarm data of alarm event corresponding to the alarm. For example, in response to a determination that a summation of evaluation values of alarm 1, alarm 2 and alarm 3 is greater than the threshold value, the first security device may generate an alarm package by packaging the alarm 1, the alarm 2 and the alarm 3. The first security device may generate an encrypted alarm package by encrypting the alarm package including the alarm 1, the alarm 2 and the alarm 3. The first security device may send the encrypted alarm package to the user terminal.

In this way, the user terminal may receive an encrypted alarm package including a plurality of alarms (e.g., the first alarm(s) and the second alarm(s)) instead of receiving the plurality of alarms independently, which reduces the number (count) and frequency of receiving alarms by the user, avoiding waking up the user terminal frequently and increasing the battery life of the user terminal. What's more, the security system 100 may not need a cloud server for sending alarms to the user terminal, and the alarms may be stored in the first security device, which satisfies a requirement of user privacy and reduces the cost of the security system 100.

In some embodiments, a user of the user terminal may input a response regarding the received alarm(s). For example, the user of the user terminal may select an alarm from the alarm(s) for display. Alternatively, the user of the user terminal may send a notification to security guards or policemen for checking a place (e.g., a residential building or a house thereof) where the first security device and/or the second security device(s) are positioned.

In some embodiments, one or more of operations 510 to 530 may be performed continuously so that real-time alarms generated by the first security device and/or the second security device(s) may be evaluated and transmitted to the user terminal for display.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 500 and/or one or more operations of the process 500 described above may be omitted. For example, an additional operation may be added between operations 520 and 530 for encrypting the alarm(s) to be sent to the user terminal.

Figure 6:
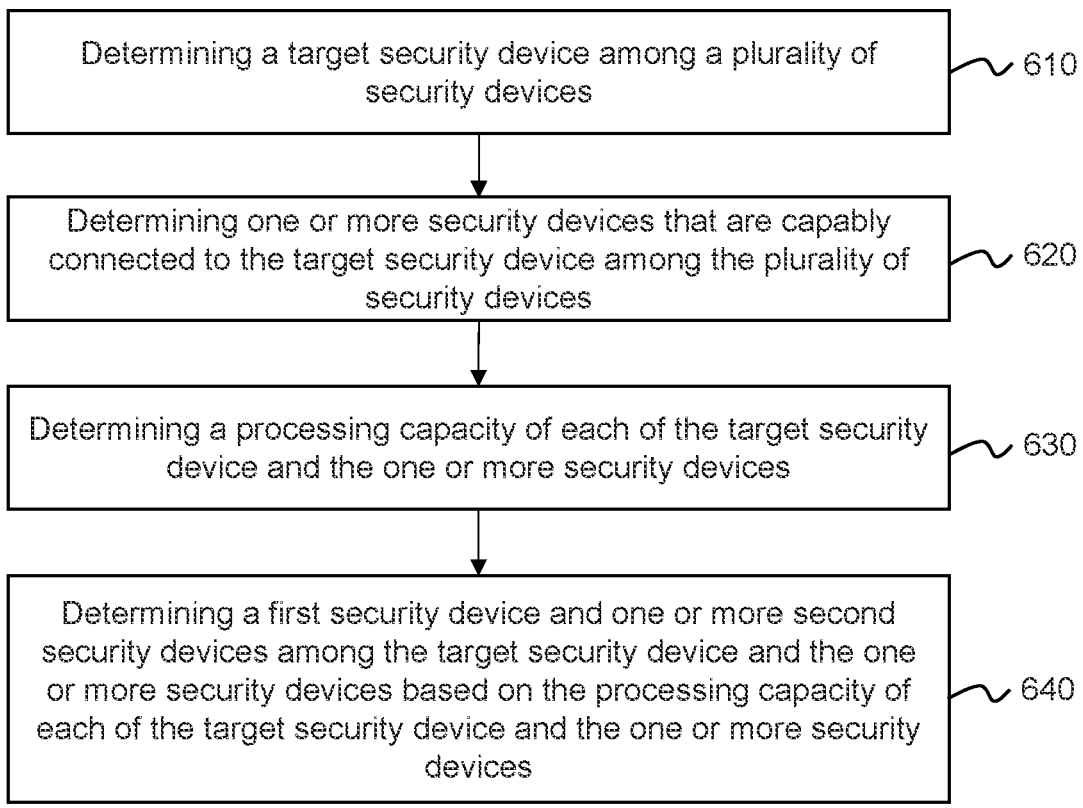
FIG. 6 is a flowchart of an exemplary process for determining a first security device and one or more second security devices in a security system according to some embodiments of the present disclosure.

FIG. 6 is a flowchart of an exemplary process 600 for determining a first security device and one or more second security devices in a security system according to some embodiments of the present disclosure. In some embodiments, one or more operations in the process 600 may be implemented by a processing engine. The processing engine may be an individual control device or a processing component integrated in a security device 110 of the security system 100 (e.g., a processing component 112 of a security device 110 as illustrated in FIG. 1B). For example, one or more operations in the process 600 may be stored in a storage device (e.g., a storage component 113 of a security device 110, the ROM 230, the RAM 240, and/or the storage 390) as a form of instructions, and invoked and/or executed by a processing component 112 (e.g., the processor 220, the CPU 340, and/or one or more modules illustrated FIG. 4) of the security device 110.

In 610, the processing engine may determine a target security device among a plurality of security devices (e.g., the plurality of security devices 110 of the security system 100).

As used herein, the target security device may be any security device (e.g., a security device 110) among the plurality of security devices. In some embodiments, each security device of the plurality security devices may be selected as the target security device. For example, the plurality of security devices may include a security device "a", a security device "b", and a security device "c". Each of the security device "a", the security device "b", and the security device "c" may be selected as the target security device.

In 620, the processing engine may determine one or more security devices that are capably connected to the target security device among the plurality of security devices.

In some embodiments, the processing engine may identify the one or more security devices from the plurality of security devices based on a searching manner using a cross-platform communication protocol (e.g., a Universal Plug-n-Play (UPnP) protocol). The processing engine may determine the target security device and the one or more security devices as a group. For example, the plurality of security devices may include a security device "a" connecting to a first LAN, a security device "b" connecting to the first LAN, and a security device "c" connecting to a second LAN. The processing engine may determine that the security device "a" and the security device "b" are connected to the same LAN (i.e., the first LAN) though a searching manner using the UPNP protocol. The processing engine may determine the security device "a" and the security device "b" as a group.

In 630, the processing engine may determine a processing capacity of each of the target security device and the one or more security devices. The target security device and the one or more security devices may also be referred to as one or more candidate security devices.

In some embodiments, the processing engine may determine a processing capacity of each of the one or more candidate security devices may store processing capacities of the one or more candidate security devices. The processing capacity of a candidate security device may be associated with an unoccupied CPU capacity and an unoccupied memory capacity of it. An unoccupied CPU capacity of a candidate security device may reflect a remaining size of a computation resource of the candidate security device (e.g., a processing component 112 of the security device. An unoccupied memory capacity of a candidate security device may reflect a remaining size of storage of the candidate security device (e.g., a storage component 113 of the security device). Exemplary processing capacity of each of the candidate security devices may be illustrated in Table 3.

TABLE 3

| Identification of Security Device | Unoccupied CPU Capacity | Unoccupied Memory Capacity | Total CPU Capacity | Total Memory Capacity | Processing Capacity |
|---|---|---|---|---|---|
| a | 1 GHz | 500 Mb | 2.4 GHz | 1 Gb | 0.48 |
| b | 900 MHz | 100 Mb | 1.5 GHz | 1 Gb | 0.22 |

As shown in Table 3, an unoccupied CPU capacity, an unoccupied memory capacity, a total CPU capacity and a total memory capacity, of a security device "a" may be 1 GHz, 500 Mb, 2.4 GHz, and 1 Gb, respectively. A processing capacity of the security device "a" may be 0.48. An unoccupied CPU capacity, an unoccupied memory capacity, a total CPU capacity and a total memory capacity, of a security device "a" may be 900 MHz, 100 Mb, 1.5 GHz, and 1 Gb, respectively. A processing capacity of the security device "b" may be 0.22.

In some embodiments, the processing capacity of each of the candidate security devices may be determined according to Equation (1) as follows:

$$s = a \times \left(\frac{y_c}{z_c}\right) + b \times \left(\frac{y_n}{z_{n)}}\right), \quad (1)$$

where s represents a processing capacity of a certain candidate security device, $y_c$ represents an unoccupied CPU capacity of the certain candidate security device, $z_c$ represents a total CPU capacity of the certain candidate security device, $y_n$ represents an unoccupied memory capacity of the certain candidate security device, $z_n$ represents a total memory capacity of the certain candidate security device, and a and b represent weight coefficients with a relationship of a+b=1. In some embodiments, the processing engine may calculate/collect an unoccupied CPU capacity of the certain candidate security device at an interval of Δt during a time period t, and $y_c$ may be determined by averaging the unoccupied CPU capacity of the certain candidate security device calculated/collected at the interval of Δt during a time period t. Similarly, the processing engine may calculate/collect an unoccupied memory capacity of the certain candidate security device at the interval of Δt during the time period t, and $y_n$ may be determined by averaging the unoccupied memory capacities of the certain security device calculated/collected at an interval of Δt during the time period t. In some embodiments, values of a and b may be determined by the user of the security system 100 or a default setting of the security system 100.

In 640, the target security device (e.g., the processing component 112 of the target security device) may determine a first security device and one or more second security devices among the one or more candidate security devices (i.e., the target security device and the one or more security devices) based on the processing capacity of each of the one or more candidate security devices (i.e., the target security device and the one or more security devices).

In some embodiments, the processing engine may determine a security device among the candidate security devices that satisfies a target condition as the first security device. For example, the processing engine may determine a particular security device that has the largest processing capacity among the processing capacity of each of the candidate security devices as the first security device. The processing engine may determine the candidate security devices except the particular security device as the one or more second security devices.

In some embodiments, the first security device and the one or more second security devices may be determined intermittently (or periodically). For example, the processing engine may redetermine the first security device and the one or more second security devices in a group at intervals (e.g., per day, per 12 hours, etc.) As another example, when the processing capacity of the first security device in current state is insufficient to perform corresponding functions, the first security device may be redetermined. As still another example, when a new security device is added into a group, the new security device may be automatically designated as a second security device in that group. Alternatively, when a new security device is added into a group, an operation to reselect a new first security device in that group may be performed to perform corresponding functions in the present disclosure. Alternatively, if a first security device is dropped from the group (e.g., the first security device is powered off), an operation to reselect a new first security device from the remaining second security devices in the group may be performed according to, for example, the processing capacity of each of the remaining second security devices.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 600 and/or one or more operations of the process 600 described above may be omitted. For example, operation 610 may be omitted. As another example, an additional operation may be added between operations 620 and 630 for dividing the plurality of security devices into one or more groups in the system 100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

The invention claimed is:

1. A system for alarm processing, the system comprising:
a plurality of security devices, each of the plurality of security devices being configured to generate one or more alarms in response to one or more alarm events, the plurality of security devices being divided into at least one group, one group of the at least one group including a first security device and one or more second security devices,
wherein the first security device is configured to:
receive, from the one or more second security devices, one or more first alarms generated by the one or more second security devices;
determine that an alarm condition is satisfied based at least on one of the one or more first alarms and one or more second alarms generated by the first security device; and
send, based on the determination, at least one of the one or more first alarms and the one or more second alarms to a user terminal.

2. The system of claim 1, wherein to determine that an alarm condition is satisfied based at least on one of the one or more first alarms and one or more second alarms generated by the first security device, the first security device is configured to:
determine that the one or more first alarms or the one or more second alarms include a target alarm event.

3. The system of claim 2, wherein to send, based on the determination, at least one of the one or more first alarms and the one or more second alarms to a user terminal, the first security device is configured to:
send the first alarm or the second alarm that includes the target alarm event to the user terminal.

4. The system of claim 1, wherein each of the one or more first alarms and the one or more second alarms corresponds to an evaluation value that indicates an emergency degree of the corresponding alarm event, and to determine that an alarm condition is satisfied based at least on one or more first alarms and one or more second alarms generated by the first security device, the first security device is configured to:
determine that a summation of the evaluation values of the one or more first alarms and the one or more second alarms is greater than a threshold value.

5. The system of claim 4, wherein to send, based on the determination, at least one of the one or more first alarms and the one or more second alarms to a user terminal, the first security device is configured to:
send the one or more first alarms and the one or more second alarms to the user terminal.

6. The system of claim 5, wherein to send, based on the determination, at least one of the one or more first alarms and the one or more second alarms to a user terminal, the first security device is configured to:
generate an alarm package by packaging the one or more first alarms and the one or more second alarms;
generate an encrypted alarm package by encrypting the alarm package; and
send the encrypted alarm package to the user terminal.

7. The system of any one of claims 1-6, wherein the first security device and the one or more second security devices in the at least one group are determined intermittently according to a process, the process comprising:
determining a processing capacity of each of one or more candidate security devices in the at least one group; and
determining, based on the processing capacity of each of the one or more candidate security devices, the first security device and the one or more second security devices.

8. The system of claim 7, wherein, for each candidate security device, its processing capacity is associated with an unoccupied CPU capacity and an unoccupied memory capacity of the candidate security device.

9. The system of any one of claims 1-8, wherein the plurality of security devices are divided into the at least one group intermittently according to a second process, the second process comprising:
determining, among the plurality of security devices, one or more security devices that are capably connected to a target security device; and
determining the target security device and the one or more security devices as a group of the at least one group.

10. The system of any one of claims 1-9, wherein at least one of the one or more security devices includes a monitoring device, an intelligence access control device, or an alarm device.

11. The system of claim 1, wherein the one or more second alarms are stored in a storage device of the first security device, and the first security device is further configured to:
store the one or more first alarms generated by the one or more second security devices in the storage device of the first security device.

12. The system of claim 11, wherein to send, based on the determination, at least one of the one or more first alarms and the one or more second alarms to a user terminal, the first security device is further configured to:
obtain the at least one of the one or more first alarms and the one or more second alarms from the storage device of the first security device.

13. A method for alarm processing, the method being implemented by a first security device of a monitoring system, the monitoring system including a plurality of security devices, each of the plurality of security devices being configured to generate one or more alarms in response to one or more alarm events, the plurality of security devices being divided into at least one group, one group of the at least one group including the first security device and one or more second security devices, the method comprising:

receiving, from the one or more second security devices, one or more first alarms generated by the one or more second security devices;

determining that an alarm condition is satisfied based at least on one of the one or more first alarms and one or more second alarms generated by the first security device; and sending, based on the determination, at least one of the one or more first alarms and the one or more second alarms to a user terminal.

14. The method of claim 13, wherein the determining that an alarm condition is satisfied based at least on one of the one or more first alarms and one or more second alarms generated by the first security device includes:

determining that the one or more first alarms or the one or more second alarms include a target alarm event.

15. The method of claim 14, wherein the sending, based on the determination, at least one of the one or more first alarms and the one or more second alarms to a user terminal includes:

sending the first alarm or the second alarm that includes the target alarm event to the user terminal.

16. The method of claim 13, wherein each of the one or more first alarms and the one or more second alarms corresponds to an evaluation value that indicates an emergency degree of the corresponding alarm event, and the determining that an alarm condition is satisfied based at least on one or more first alarms and one or more second alarms generated by the first security device includes:

determining that a summation of the evaluation values of the one or more first alarms and the one or more second alarms is greater than a threshold value.

17. The method of claim 16, wherein the sending, based on the determination, at least one of the one or more first alarms and the one or more second alarms to a user terminal includes:

sending the one or more first alarms and the one or more second alarms to the user terminal.

18. The method of claim 17, wherein the sending, based on the determination, at least one of the one or more first alarms and the one or more second alarms to a user terminal includes:

generating an alarm package by packaging the one or more first alarms and the one or more second alarms;

generating an encrypted alarm package by encrypting the alarm package; and sending the encrypted alarm package to the user terminal.

19. The method of any one of claims 13-18, wherein the first security device and the one or more second security devices in the at least one group are determined intermittently according to a process, the process comprising:

determining a processing capacity of each of one or more candidate security devices in the at least one group; and determining, based on the processing capacity of each of the one or more candidate security devices, the first security device and the one or more second security devices.

20. The method of claim 19, wherein, for each candidate security device, its processing capacity is associated with an unoccupied CPU capacity and an unoccupied memory capacity of the candidate security device.

21. The method of any one of claims 13-20, wherein the plurality of security devices are divided into the at least one group intermittently according to a second process, the second process comprising:

determining, among the plurality of security devices, one or more security devices that are capably connected to a target security device; and determining the target security device and the one or more security devices as a group of the at least one group.

22. The method of any one of claims 13-21, wherein at least one of the one or more security devices includes a monitoring device, an intelligence access control device, or an alarm device.

23. The method of claim 13, wherein the one or more second alarms are stored in a storage device of the first security device, the method further comprising:

storing the one or more first alarms generated by the one or more second security devices in the storage device of the first security device.

24. The method of claim 23, wherein the sending, based on the determination, at least one of the one or more first alarms and the one or more second alarms to a user terminal further includes:

obtaining the at least one of the one or more first alarms and the one or more second alarms from the storage device of the first security device.

25. A system for alarm processing, the system comprising:

a plurality of security devices, each of the plurality of security devices being configured to generate one or more alarms in response to one or more alarm events, the plurality of security devices being divided into at least one group, one group of the at least one group including a first security device and one or more second security devices, wherein the first security device comprises:

an acquisition module configured to receive, from the one or more second security devices, one or more first alarms generated by the one or more second security devices;

a determination module configured to determine that an alarm condition is satisfied based at least on one of the one or more first alarms and one or more second alarms generated by the first security device; and a transmission module configured to send, based on the determination, at least one of the one or more first alarms and the one or more second alarms to a user terminal.

26. A non-transitory computer readable medium, comprising at least one set of instructions for alarm processing in a monitoring system, the monitoring system including a plurality of security devices, each of the plurality of security devices being configured to generate one or more alarms in response to one or more alarm events, the plurality of security devices being divided into at least one group, one group of the at least one group including a first security device and one or more second security devices, wherein when executed by one or more processors of the first security device, the at least one set of instructions causes the first security device to perform a method, the method comprising:

receiving, from the one or more second security devices, one or more first alarms generated by the one or more second security devices;

determining that an alarm condition is satisfied based at least on one of the one or more first alarms and one or more second alarms generated by the first security device; and sending, based on the determination, at least one of the one or more first alarms and the one or more second alarms to a user terminal.

\* \* \* \* \*